United States Patent
Kamen et al.

(10) Patent No.: US 6,361,640 B1
(45) Date of Patent: Mar. 26, 2002

(54) EDGE DECORATED ARTICLES AND METHOD OF MAKING SAME USING HOT STAMPING FOILS

(75) Inventors: Melvin E. Kamen, Highlands; Marvin Wells, East Windsor, both of NJ (US)

(73) Assignee: Deco Patents, Inc., Edison, NJ (US)

( * ) Notice: Subject to any disclaimer, the term of this patent is extended or adjusted under 35 U.S.C. 154(b) by 0 days.

(21) Appl. No.: 09/383,723

(22) Filed: Aug. 26, 1999

Related U.S. Application Data

(60) Provisional application No. 60/098,487, filed on Aug. 31, 1998.

(51) Int. Cl.[7] .......................... B44C 1/165; B32B 31/00; B32B 31/20; A47G 14/30; C03C 17/38

(52) U.S. Cl. .......................... 156/233; 156/230; 156/240; 156/241; 156/247; 156/277; 156/289; 427/148; 428/914; 220/574; 118/211

(58) Field of Search ................................. 156/230, 233, 156/238, 239, 240, 241, 247, 277, 289, 391, 540, 546, 553, 547; 427/146, 147, 148; 428/195, 200, 202, 204, 205, 208, 209, 914; 220/574, 574.1, 574.2, 574.3, 557; 118/211, 212

(56) References Cited

U.S. PATENT DOCUMENTS

| | | | | |
|---|---|---|---|---|
| 2,062,425 A | * | 12/1936 | Peters | 118/232 |
| 2,836,145 A | * | 5/1958 | Becker | 118/218 |
| 3,251,707 A | * | 5/1966 | Blank et al. | 427/284 |
| 4,081,304 A | * | 3/1978 | Bruseschi | 156/212 |
| 4,504,351 A | * | 3/1985 | Antonson | 156/391 |
| 5,391,247 A | | 2/1995 | Kamen et al. | 156/233 |
| 5,487,927 A | | 1/1996 | Kamen et al. | 128/34.4 |
| 5,571,359 A | | 11/1996 | Kamen et al. | 156/233 |
| 5,585,123 A | | 12/1996 | Kamen et al. | 428/35.7 |
| 5,656,336 A | | 8/1997 | Kamen et al. | 427/511 |

* cited by examiner

*Primary Examiner*—Richard Crispino
*Assistant Examiner*—J. A. Lorenzo
(74) *Attorney, Agent, or Firm*—Lerner, David, Littenberg, Krumholz & Mentlik, LLP

(57) ABSTRACT

Articles such as glassware, ceramicware and hollowware are decorated with hot stamping foil along their exposed edge. The hot stamping foil is adhered to an underlying radiation curable adhesive ink which avoids the use of inks or frits having heavy metals such as lead which are leachable. The hot stamping foil may have a metallized noble metal decorative layer. The hot stamping process employs a polymer die having a hardness in the range of from about 50 to 80 durometer for adhering the hot stamping foil to the article under applied heat and pressure.

15 Claims, 2 Drawing Sheets

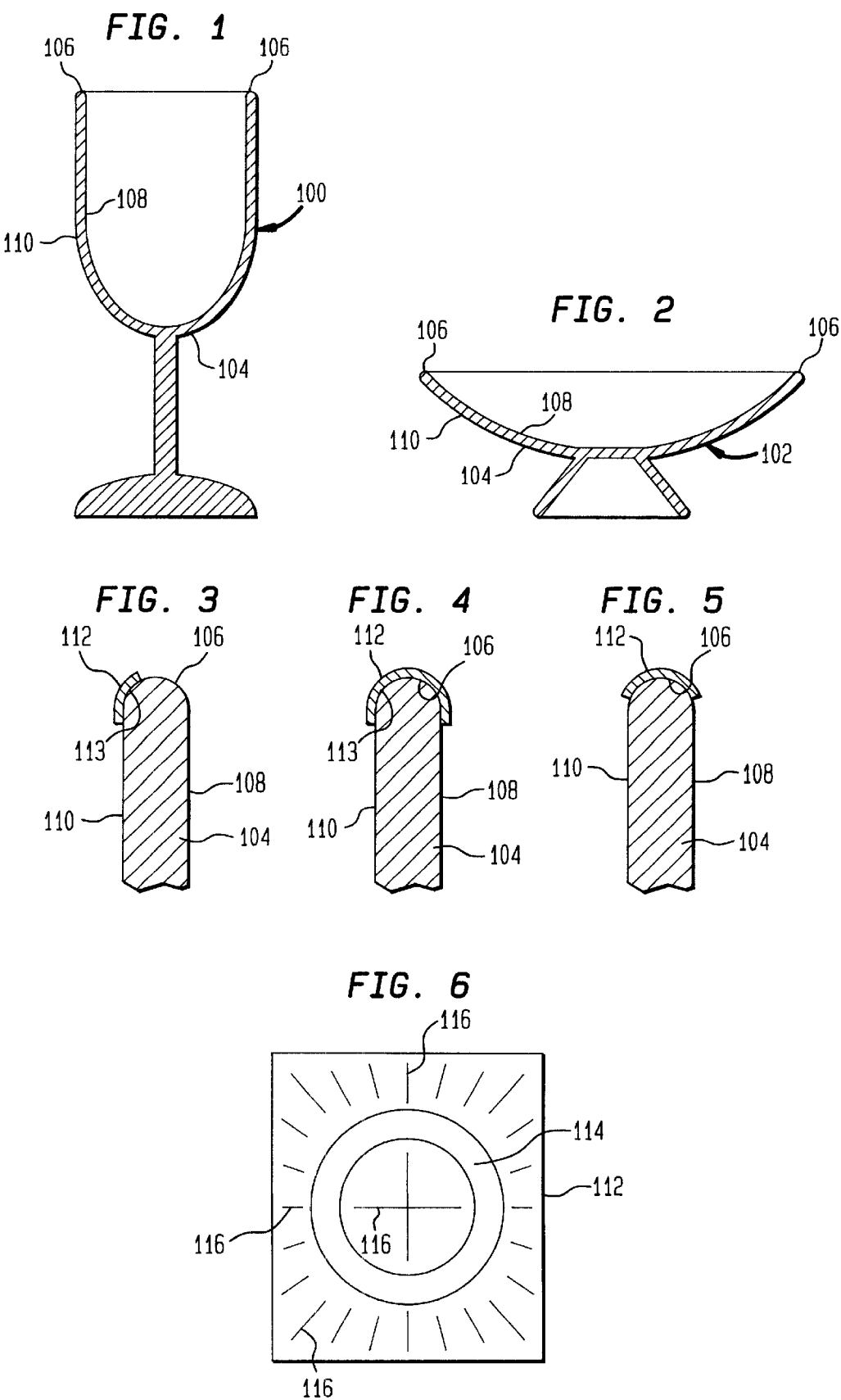

000# EDGE DECORATED ARTICLES AND METHOD OF MAKING SAME USING HOT STAMPING FOILS

The present application claims the benefit of U.S. Provisional Application No. 60/098,487, filed Aug. 31, 1998, the disclosure of which is hereby incorporated by reference herein.

BACKGROUND OF INVENTION

The present invention relates in general to various articles such as glassware, ceramicware and/or hollowware which is edge decorated with noble metals.

More specifically, the present invention relates to a method of decorating the edge, i.e., the lip or rim, of various articles with a hot stamping foil of a noble metal and the resulting decorated articles made therefrom.

In the article decorating industry, there exists the desire to apply a suitable material in various predetermined patterns to an article for decorative or other purposes. One of the important commercial applications today is in the decorating of the edge, i.e., the lip or rim, of an article which generally has a cylindrical configuration. The term "article" as used herein is intended to cover such articles generally within the category of glassware, hollowware and/or ceramicware. More specifically, these articles include glasses, plates, cups, dishes, bottles, or other such articles having an edge, i.e., a lip or rim, which is intended to be decorated. The articles may be formed from a variety of materials, for example, glass and ceramic, although plastic articles are known to be decorated as well.

The prior decoration of glass and ceramic articles typically used lead based inks or frits to achieve a raised or flat decorative effect. In the case of a raised effect, a lead based flux is first applied to the underlying article such as by roller or screen printing, and subsequently fired at high temperature. A decorative layer, such as gold ink, is subsequently applied in a similar manner over the fired flux, once again being fired at high temperature to form a decorative gold layer. Where a flat non-raised decorative effect is desired, the lead based flux layer is generally eliminated. However, the gold ink used also included a quantity of lead to enable adhesion of the gold ink to the article such as glass or ceramic material. In either case, both processes require the presence of lead, as well as potentially other toxic metals such as cadmium. During use of the article, it is known that the lead or other heavy metals are susceptible of leaching out of the decorative coating, thereby contaminating the contained materials, such as food products and the like. As a result of the health hazards created from the use of lead, lead containing inks have been considered undesirable for use on glassware, ceramicware and/or hollowware, particularly where food products are involved.

Hot stamping foils have been known for use in decorating various objects over generally planar surfaces. Hot stamping foil is generally a laminate comprised of a carrier material (often polyester or a similar material capable of release), a release film between the carrier and a subsequent decorative coat which is usually a color or a metallized coat, for example, a noble metal such as silver, gold, palladium or platinum. Aluminum metallized coatings are also used in hot stamping foils. The foil may contain other optional layers, such as one or more protective layers, hot melt adhesive layers, etc., between the metallized layer or layers and the carrier material. More specifically, hot stamping foils can be defined as a multilayer web comprised of a backing film, carrier, a release coating, one or more protective top coatings, one or more color coatings and a hot melt adhesive, in that order.

The hot stamping foil is compressed against the article with the hot melt adhesive layer being compressed against the article substrate. In general, hot stamping foils will not adhere directly to a glass or ceramic substrate. To this end, it is known to first apply by a variety of methods such as silk screening, printing, etc., an adhesive ink at those locations where it is desired to apply the hot stamping foil. The adhesive ink is cured, for example, by use of radiation, such as ultraviolet radiation, prior to the hot stamping process. A press, which may be a standard hot stamping press, or a hand held press, is heated to a temperature sufficient to cause the hot melt adhesive layer of the hot stamping foil to adhere to the adhesive ink on the article to be foiled. The application of heat causes the adhesive side of the hot stamping foil to become adhesively adhered to the cured adhesive ink, but not to the ink free areas of the article.

Notwithstanding the existence of known hot stamping foils and methods of application, there has heretofore been unknown the use of such foils in decorating other than generally planar surfaces of articles such as glassware, ceramicware and hollowware. There therefore remains a need for a method for decorating the edge, i.e., the lip or rim, of various articles such as glassware, ceramicware and hollowware with a hot stamping foil which eliminates the use of inks containing heavy metals such as lead and the like, as well as the resulting decorated articles made therefrom.

SUMMARY OF THE INVENTION

One object of the present invention is to provide an article such as glassware, ceramicware or hollowware having an edge decorated with a hot stamping foil.

Another object of the present invention is to provide an article having an edge decorated with a hot stamping foil of a noble metal which avoids the use of previously known inks containing lead and/or other heavy metals.

Another object of the present invention is to provide a method for decorating articles such as glassware, ceramicware or hollowware having an edge decorated with a hot stamping foil, including the use of a radiation curable adhesive ink.

In accordance with one embodiment of the present invention, an article includes an edge decorated with a hot stamping foil. The article is in the nature of a body having an exposed edge formed between an inner surface and an outer surface. A radiation cured adhesive ink is adhered to at least a portion of the edge, and a hot stamping foil is adhered to the ink overlying at least a portion of the edge.

In accordance with another embodiment of the present invention there is described an article of polymer material includes a body having an exposed edge formed between an inner surface and an outer surface. A hot stamping foil is adhered to at least a portion of said edge by application of heat and pressure thereto using a die of polymer material having a hardness in the range of about 50 to about 80 durometer.

In accordance with another embodiment of the present invention, an article includes an edge decorated with a hot stamping foil. The article is in the nature of a body having an exposed edge formed between an inner surface and an outer surface. A radiation curable adhesive ink is applied to at least a portion of the edge, with the adhesive ink adhered to the edge by being exposed to radiation operative for curing the ink. A hot stamping foil is applied to the radiation cured adhesive ink overlying at least a portion of the edge. The hot stamping foil is adhered to the radiation cured adhesive ink by pressing the foil against the edge with a die heated to a temperature sufficient to cause the foil to adhere thereto.

In accordance with another embodiment of the present invention, there is described a method for decorating an exposed edge of an article formed between an inner and outer surface of the article with a hot stamping foil. The method includes applying a radiation curable adhesive ink to at least a portion of the edge, the adhesive ink being operable when cured to bond to the edge of the article. The adhesive ink is cured by exposing the ink to radiation operative to curing the ink, thereby bonding the ink to the edge of the article. A sheet of hot stamping foil is pressed against the edge of the article with a die at a temperature sufficient to cause a portion of the foil to adhere to the cured adhesive ink.

In accordance with another embodiment of the present invention, there is described a method of decorating an exposed edge of a glass or ceramic article formed between an inner and outer surface of the article with a hot stamping foil. The method includes applying an ultraviolet curable adhesive ink to at least a portion of the edge, the adhesive ink being operable when cured to bond to the edge of the article. The adhesive ink is cured by exposing the ink to ultraviolet radiation operative for curing the ink thereby bonding the ink to the edge of the article. A sheet of hot stamping foil is pressed against the edge of the article with a die, the hot stamping foil including a layer of material selected from the group consisting of gold, silver, aluminum, palladium and platinum. The die is formed of polymer material having a hardness in the range of about 50–80 durometer. The die is heated to a temperature sufficient to cause a portion of the foil to adhere to the cured adhesive ink.

In accordance with another embodiment of the present invention, there is described an article having an edge decorated with a hot stamping foil. The article includes a body of glass or ceramic having an exposed edge formed between an inner surface and an outer surface. An ultraviolet curable adhesive ink is applied to at least a portion of the edge, the adhesive ink adhering to the edge by being exposed to ultraviolet radiation operative for curing the ink. A hot stamping foil is applied to the radiation cured adhesive ink overlying at least a portion of the edge, the hot stamping foil including a layer of material selected from the group consisting of gold, silver, aluminum, palladium and platinum. The hot stamping foil adhered to the radiation cured adhesive ink by pressing the foil against the edge with a die heated to a temperature sufficient to cause the foil to adhere thereto. The die is formed of polymer material having a hardness in the range of about 50–80 durometer.

BRIEF DESCRIPTION OF THE DRAWINGS

The above description, as well as further objects, features and advantages of the present invention, will be fully understood with reference to the following detailed description of an edge decorated article with a hot stamping foil and method of making same, when taken in conjunction with the accompanying drawings, wherein:

FIGS. 1 and 2 are cross-sectional views of an article in the nature of glassware, ceramicware and/or hollowware having an edge to be decorated with a hot stamping foil in accordance with the present invention;

FIGS. 3–5 are cross-sectional views of a portion of the edge of the article shown in FIGS. 1 and 2 illustrating a hot stamping foil decorating various portions of the edge of the article;

FIG. 6 is a top plan view of a hot stamping foil in accordance with one embodiment of the present invention;

DETAILED DESCRIPTION OF THE PREFERRED EMBODIMENTS

Figure 7:
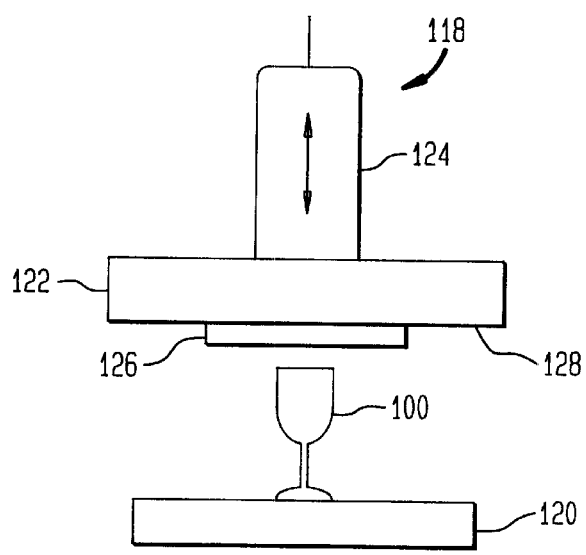
FIG. 7 is a front elevational view of a press and heated die combination for use in practicing the method of the present invention pursuant to one embodiment.

Referring to the drawings, wherein like reference numerals represent like elements, there is shown in FIGS. 1 and 2 a variety of articles 101, 102 to be decorated with a hot stamping foil as to be described more fully hereinafter. The articles 100, 102 may have a variety of forms, for example, glassware, ceramicware and/or hollowware. In particular, the articles 100, 102 may be in the nature of specific items, for example, glasses, cups, plates, dishes, bottles, bowls, vases and the like. The articles 100, 102 can be constructed from a variety of materials, for example, glass, ceramic, plastic, etc. Accordingly, the term "article" as used herein encompasses any of the aforementioned articles and materials of composition. Each of the articles 100, 102 includes a body 104 having an exposed edge 106, formed between an inner surface 108 and an outer surface 110. The edge 106, in plan view, may be continuous in the shape of a circle, oval, rectangle, triangle, or any other geometric shape, either uniform or irregular.

In accordance with the present invention as shown in FIGS. 3–5, a hot stamping foil 112 may be adhered to various portions of the edge 106 of the articles 100, 102. As shown in FIG. 3, the hot stamping foil 112 is adhered only to an outer portion of edge 106 adjacent outer surface 110. In FIG. 4, the hot stamping foil 112 is adhered over the entire edge 106, and partially along the adjacent inner and outer surfaces 108, 110. In FIG. 5, the hot stamping foil 112 is adhered mainly to the edge 106, the adjacent inner and outer surfaces 108, 110 being substantially free of the hot stamping foil. As such, the hot stamping foil 112 may be applied to various portions of the edge 106 and/or inner and outer surfaces 108, 110 as will be more apparent from a description of the method of the present invention.

As previously described, known hot stamping foils generally will not adhere to certain substrates such as glass or ceramic. To this end, there is known from Kamen, et al., U.S. Pat. Nos. 5,487,927 and 5,585,153 a method for decorating a glass product with a hot stamping foil. Briefly, the disclosed method for decorating a glass substrate with a hot stamping foil includes applying a radiation curable adhesive ink to the glass substrate in a pre-determined design that leaves some areas of the glass ink free, the ink being operable when cured to bond to glass and, when heated after curing, to bond to the hot stamping foil. The ink is completely cured on the substrate by exposing the ink to radiation by which it is curable, for example, ultraviolet radiation, e.g., light having a wavelength of about 4–400 nm., thereby bonding the ink design to the glass. A sheet of hot stamping foil is pressed against the substrate with a press heated to a temperature sufficient to cause the foil to adhere to the heated, cured ink design, but not to the ink free areas of the glass. The hot stamping foil is peeled away from the substrate thereby leaving behind a portion of the foil permanently adhered to the adhesive ink design. Suitable adhesive inks and hot stamping foils for practicing the present invention are disclosed in the aforementioned Kamen, et al. Patents, the disclosures of which are incorporated herein by reference. The disclosed adhesive inks are particularly suitable for use in that they are free of heavy metals and other toxic leachable components. Hot stamping foils suitable for the present invention are obtainable from Crown Royal Leaf of Paterson, N.J.

A layer of an adhesive ink 113 is applied to that portion of edge 106 and/or inner and/or outer surfaces 108, 110 where it is desired to apply and adhere the hot stamping foil 112. The adhesive ink 113 may be applied by conventional screen printing, roller coating and the like. Depending upon the composition of the adhesive ink, the ink may be cured using ultraviolet radiation, actinic radiation, e.g., light having a wavelength of about 4–600 nm, and/or electron beam radiation as disclosed in the Kamen, et al. Patents. The hot stamping foil 112 will only adhere to those portions of the article 100, 102 which have been coated with the adhesive ink 113. As the adhesive ink 113 is cured using radiation, as opposed to firing, the adhesive ink is devoid of lead and other heavy metals which might leach out during use of the article 100, 102 thereby contaminating any contained products such as food products. In the case of articles 100, 102 of plastic, it is generally not required that an adhesive ink 113 be used. In this regard, it is contemplated that the heat and pressure applied during application of the hot stamping foil 112 will be sufficient to effect adhesion of the foil generally to a plastic article.

Subsequent to curing of the adhesive ink 113 using suitable radiation, a hot stamping foil 112 is applied to the article 100, 102 under heat and pressure. As shown in FIG. 6, by way of example, the hot stamping foil 112 is in the nature of a multilayer laminated sheet having a metallized layer 114 corresponding to the desired decorative pattern for decorating the edge 106 of the article 100, 102 as previously noted. To facilitate applying the metallized layer 114 over a curved surface, such as edge 106, the sheet may be provided with relief cuts 116. The relief cuts 116 eliminate stress when conforming the planar sheet of the hot stamping foil 112 to the three dimensional configuration of the edge 106 and/or portions of the inner surface and outer surface 108, lo. The thickness of the metallized layer 114 on the hot stamping foil 112 will generally be the thickest film required to become opaque, for example, between about 250 to 1000 Angstroms.

Referring to FIG. 7, a press 118 includes a support 120, a heated platen 122 and a pneumatic or hydraulic cylinder 124. By operation of the cylinder 124, the heated platen 122 is caused to move upward and downward toward and away from the support 120. A die 126 is attached to the bottom surface 128 of the heated platen 122. The term "die" means any object which is capable to being heated to a temperature sufficient to cause the hot stamping foil to adhere to the cured adhesive ink, and is capable of compressing the hot stamping foil against the article 100, 102. Suitable dies include dies of brass, steel, or polymers such as silicone found on traditional stamping machines, hand held rollers, silicone rollers, arced dies and the like. Preferably, the die 126 is composed of a metal impregnated silicone composition which facilitates heat transfer from the heated platen 122 to the hot stamping foil 112. In this regard, the operating range for the hot stamping process is, by way of example, in the range from about 350–450° F., and preferably about 400° F. Suitable silicone metal impregnated dies 126 may be obtained from a variety of manufacturers, for example, Schwerdetle of Connecticut.

As the edge 106 to be decorated with the hot stamping foil 112 is often not flat, that is, being slightly rounded, it is preferable that the die 126 be formed of a compressible material such as a polymer, and preferably by way of one example, silicone having a hardness in the range of from about 50 to 80 durometer. In general, it is noted that the harder the die 126, the better adhesion one can achieve with the hot stamping foil 112 as one can apply a higher degree of pressure to the article 100, 102. The hardness of the die 126 will affect its ability to conform to a non-planar surface, such as the curved surface of edge 106. In this regard, a relatively hard die, e.g., about 80 durometer, by virtue of having a high durometer is generally suitable for hot stamping the top surface of edge 106 as illustrated in FIG. 5 which are generally flat or of slight curvature. As shown, the hot stamping foil 112 is not applied to the inner surface 108 or outer surface 110. In the case where it is desired that the hot stamping foil 112 be adhered to the curved areas of edge 106 adjacent either the inner surface 108 or outer surface 110, see FIG. 3, a softer die by virtue of having a lower durometer is desired. This enables the edge 106 to compress inwardly into the surface of the die 106 to enable the hot stamping foil 112 to contact the initial adjacent inner surface 108 or outer surface 110. Thus, the hardness of the die 126 will, to some degree, control the ability of applying the hot stamping foil 112 to various portions of the edge 106 and/or inner surface 108 or outer surface 110.

Figure 8:
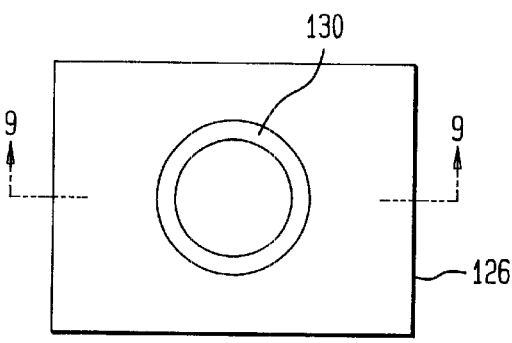
FIG. 8 is the top plan view of a die constructed in accordance with one embodiment of the present invention for application of a hot stamping foil over the entire edge of an article and partially along the inner and outer surfaces defining the edge.
Figure 9:
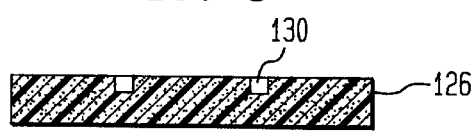
FIG. 9 is a cross-sectional view of the die taken along line 9—9 in FIG. 8.

The use of a relatively soft die 126, e.g., about 50 durometer, will allow the die to mold the hot stamping foil 112 around various configurations of the edge 106. As noted above, the use of relatively soft dies 126 will limit the compressive force that may be applied to the hot stamping foil 112. Where it is desired to have a portion of the hot stamping foil 112 extend over an adjacent portion of the inner surface 108 and/or outer surface 110, it is preferred to use a die having a conforming cavity. This enables the use of dies 126 having a greater hardness. As shown in FIGS. 8 and 9, the die 126 includes an annular cavity 130 dimensioned operatively for receiving the edge 106 of the article 100, 102 to be hot stamped. The cavity 130 will receive edge 106 and a portion of the inner surface 108 or outer surface 110 so as to press a hot stamp foil 112 positioned therebetween into bonding contact with the adhesive ink 113. A polymer die 126 having a cavity 130 will have a hardness of, for example, about 65 durometer. Further, by way of example, it is contemplated that a die pressure in the range of about 500 to 1500 psi is suitable for adhering the hot stamping foils 112.

Figure 10:
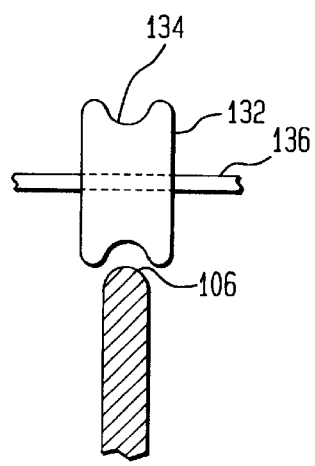
FIG. 10 is a front elevational view showing the construction of a roller die in accordance with another embodiment of the present invention.
Figure 11:
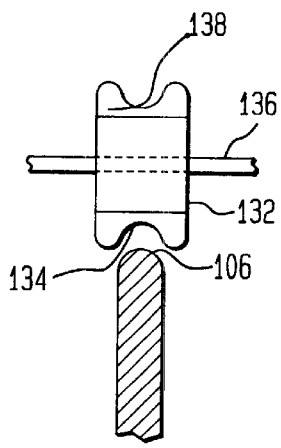
FIG. 11 is a front elevational view showing the construction of a roller die in accordance with another embodiment of the present invention.

Referring to FIG. 10, a die 132 in accordance with another embodiment of the present invention is constructed as a roller having a concave circumferential edge 134 operative for engaging the edge 106 of the article 100, 102 for pressing a hot stamping foil 112 thereon. The die 132 may be journaled about a suitable rod 136 for rotation. In applying the hot stamping foil 112, the die 132 may be moved over the edge 106 of the article 100, 102. In the alternative, the article 100, 102 may be rotated so as to maintain its edge 106 in pressure contact with the die 132. The die 132 may be constructed from various materials such as metal and relatively hard plastics. In an alternative embodiment shown in FIG. 11, the die 132 is provided with a polymer insert 138 about the periphery of the die. The insert 138 can be constructed from materials similar to that used in construction of die 126.

Although the invention herein has been described with reference to particular embodiments, it is to be understood that the embodiments are merely illustrative of the principals and application of the present invention. It is therefore to be understood that numerous modifications may be made to the embodiments and that other arrangements may be devised without departing from the spirit and scope of the present invention as defined by the claims.

What is claimed is:

1. A method of decorating an exposed edge of an article formed between an inner and outer surface of said article with a hot stamping foil, said method comprising the steps of applying a radiation curable adhesive ink to at least a portion of said edge, said adhesive ink being operable when cured to bond to said edge of said article, curing said ink by exposing said ink to radiation operative for curing said ink thereby bonding said ink to said edge of said article, pressing a sheet of hot stamping foil against the edge of said article with a die heated to a temperature sufficient to cause a portion of said foil to adhere to the cured adhesive ink.

2. The method of claim 1, further including the step of removing the hot stamping foil which has not adhered to said article at locations devoid of said cured adhesive ink.

3. The method of claim 1, wherein said body is formed from a material selected from the group consisting of glass, ceramic and plastic.

4. The method of claim 1, said hot stamping foil includes a layer of material selected from the group consisting of gold, silver, aluminum, palladium and platinum.

5. The method of claim 1, wherein said radiation comprises ultraviolet radiation.

6. The method of claim 1, wherein said ink is applied to said edge by silk screening.

7. The method of claim 1, wherein said body comprises ceramicware, glassware or hollowware.

8. The method of claim 1, wherein said hot stamping foil is confined to a location overlying said edge between said inner surface and said outer surface.

9. The method of claim 1, wherein said hot stamping foil overlies a portion of said edge and a portion of said outer surface of said body adjacent said edge.

10. The method of claim 1, wherein said die is formed of polymer material having a hardness in the range of about 50–80 durometer.

11. The method of claim 1, wherein said die includes a groove operative for receiving said edge of said article therein.

12. The method of claim 1, wherein said die is in the form of a planar body.

13. The method of claim 1, wherein said die is in the form of a disk having a concave circumferential edge operative for engaging said edge of said body.

14. A method of decorating an exposed edge of a glass or ceramic article formed between an inner and outer surface of said article with a hot stamping foil, said method comprising the steps of applying an ultraviolet curable adhesive ink to at least a portion of said edge, said adhesive ink being operable when cured to bond to said edge of said article, curing said ink by exposing said ink to ultraviolet radiation operative for curing said ink thereby bonding said ink to said edge of said article, pressing a sheet of hot stamping foil against the edge of said article with a die, said hot stamping foil including a layer of material selected from the group consisting of gold, silver, aluminum, palladium and platinum, said die formed of polymer material having a hardness in the range of about 50–80 durometer, and heating said die to a temperature sufficient to cause a portion of said foil to adhere to the cured adhesive ink.

15. The method of claim 14, wherein said die is heated to a temperature in the range of about 350–450° C.

* * * * *

UNITED STATES PATENT AND TRADEMARK OFFICE
CERTIFICATE OF CORRECTION

PATENT NO.   : 6,361,640 B1
DATED        : March 26, 2002
INVENTOR(S)  : Melvin E. Kamen and Marvin Wells It is certified that error appears in the above-identified patent and that said Letters Patent is hereby corrected as shown below:

<u>Column 5,</u>
Line 50, "1o" should read -- 110 --.

Signed and Sealed this

Twenty-fifth Day of June, 2002

Attest:

JAMES E. ROGAN
Attesting Officer     *Director of the United States Patent and Trademark Office*